United States Patent [19]

Whittenberger et al.

[11] Patent Number: 4,942,020
[45] Date of Patent: Jul. 17, 1990

[54] CONVERTER FOR REMOVING POLLUTANTS FROM A GAS STREAM

[75] Inventors: William A. Whittenberger, Garrettsville, Ohio; Edward M. Smith, Wyncote, Pa.; William R. Alcorn, Cleveland Heights; Wesley P. Bullock, Windham, both of Ohio

[73] Assignee: W.R. Grace & Co.-Conn., New York, N.Y.

[21] Appl. No.: 211,864

[22] Filed: Jun. 27, 1988

[51] Int. Cl.⁵ .......................... B01J 35/04; F01N 3/28
[52] U.S. Cl. ................................. 422/180; 422/222; 502/527; 55/521
[58] Field of Search ............ 422/180, 222, 211, 311; 55/278, 521; 502/527; 428/603, 604, 593

[56] References Cited

U.S. PATENT DOCUMENTS

| | | | |
|---|---|---|---|
| 2,915,426 | 12/1959 | Poelman | 55/521 |
| 3,227,599 | 1/1966 | Holland | 55/521 |
| 3,372,533 | 3/1968 | Rummel | 55/521 |
| 3,709,706 | 1/1973 | Sowman | 106/57 |
| 3,795,524 | 3/1974 | Sowman | 106/65 |
| 4,047,965 | 9/1977 | Karst | 106/65 |
| 4,166,147 | 8/1979 | Lange et al. | 428/328 |
| 4,273,681 | 6/1981 | Nonnenmann | 502/527 |
| 4,318,888 | 3/1982 | Chapman et al. | 422/180 |
| 4,511,664 | 4/1985 | Yamamoto | 501/35 |
| 4,585,500 | 4/1986 | Minjolle et al. | 156/89 |
| 4,652,286 | 3/1987 | Kusuda et al. | 55/523 |
| 4,707,399 | 11/1987 | Rambosek | 428/225 |
| 4,711,009 | 12/1987 | Cornelison et al. | 422/180 |
| 4,725,411 | 2/1988 | Cornelison | 422/180 |
| 4,753,919 | 6/1988 | Whittenberger | 502/527 |
| 4,810,588 | 3/1989 | Bullock et al. | 428/603 |
| 4,845,073 | 7/1989 | Cyron | 502/439 |

Primary Examiner—Robert J. Warden
Assistant Examiner—D. John Griffith, Jr.
Attorney, Agent, or Firm—Edward J. Cabic

[57] ABSTRACT

A converter for treating gases to remove pollutants or particulate matter having layers of normally nesting corrugated thin metal foil, with or without a catalyst supported thereon, and characterized by spaced strands of wire or nonvitreous inorganic ceramic thread interposed between the layers to maintain them in spaced relation for the passage of gas, e.g., exhaust gas from an engine or plant, therethrough. The principal advantages are the relatively high particulate trap efficiency, the relatively low back pressure, and the low cost of manufacture.

23 Claims, 2 Drawing Sheets

CONVERTER FOR REMOVING POLLUTANTS FROM A GAS STREAM

This invention relates to a converter useful for treating exhaust gases which contain pollutants, such as, carbon monoxide, unburned hydrocarbons, sulfur dioxide, nitrogen oxides (NOx), particulates and the like, to remove or chemically alter such pollutants and convert them into environmentally acceptable materials, such as carbon dioxide, water, and nitrogen, etc. More particularly, this invention relates to an improved converter which is characterized by the use of normally nesting corrugated thin metal layers maintained in spaced non-nesting relation by the interposition of fibers or bundles of fibers which are unaffected by the temperatures of exhaust gases or any regeneration temperatures in the event the device is used as a particulate trap.

BACKGROUND OF THE INVENTION AND PRIOR ART

Although a considerable amount of effort has been given to the production of corrugated thin metal foil converters in which the successive layers of foil are nonnesting as, for example, in U.S. Pat. No. 4,725,411 dated February 16, 1988, little attention has been paid to the use of corrugated thin metal foil layers which are normally nesting. Our-pending application Ser. No. 089,578 filed August 26, 1987, now issued as U.S. Pat. No. 4,869,738, provides one method of keeping normally nesting layers in spaced relation utilizing sized spherical bodies, e.g., small stainless steel spheres, dispersed in the washcoat of refractory metal oxide, e.g., alumina. However, some difficulty in maintaining a single thickness of the small spheres has been experienced, and an improved means for maintaining normally nestable corrugated layers in spaced relation other than a flat layer of foil (which is common in such cases) has now been found.

It has been found that an improved converter having layers of normally nesting corrugated thin metal may be fabricated and inexpensively made by corrugating a thin metal strip with regular straight or patterned corrugations and which will nest together if layered, cutting the strip into segments of desired length, and superimposing on the segments two or more fibers or bundles of fibers to prevent nesting. The fiber or fibers may be metal or ceramic or ceramic/cermet. They can be formed to conform to or mesh with the corrugations, i.e. have the same profile. The preferred metal is ferritic stainless steel or aluminized stainless steel wire having a diameter equal to from 0.25 times the amplitude of the corrugations up to 3.0 times such amplitude. The ceramic or cermet fibers are generally in the form of threads formed of many fibers which fibers are from 0.5 to 3 microns in diameter.

Reference may be had to U.S. Pat. No. 4,707,399 dated November 17, 1987 to Rambosek; to U.S. Pat. No. 4,652,286 dated March 24, 1987 to Masaaki; to U.S. Pat. No. 4,585,500 dated April 29, 1986; to U.S. Pat. No. 4,511,664 dated April 16, 1985; to U.S. Pat. No. 4,166,147 dated August 28, 1979; to U.S. Pat. No. 4,047,965 dated September 13, 1977; U.S. Pat. No. 3,795,524 dated March 5, 1974 and to U.S. Pat. No. 3,709,706 dated January 9, 1973 for disclosures of non-vitreous inorganic or metal oxide ceramic fibers which may be formed into multistrand threads of the desired thickness (0.5 to 2.5 times the amplitude of the corrugations) and used as the spacing elements in the converters of the present invention. These U.S. Patents are incorporated herein by reference thereto.

BRIEF DESCRIPTION OF THE INVENTION

Briefly stated, the present invention is in a converter for altering the composition of gases passing therethrough by causing carbon particles and volatile organic compounds to be stored for periodic oxidation or burning off, thus causing a chemical change to occur. The converter comprises a module having a gas inlet and a gas outlet. The module is built up of a series of individual layers of corrugated thin metal, e.g., stainless steel, or aluminum coated stainless steel, having a predetermined length and extending between the inlet and the outlet. These layers are normally nestable, that is, if the layers are placed one on top of the other, they will nest together and block any openings so that gas passage therethrough is entirely cut off or seriously impaired. Generally, an open area of from 80% to 95% is desired to allow for gas passage. Desirably, albeit not essentially, the surfaces of the thin metal are provided with a washcoating of a refractory metal oxide, e.g., alumina, titania, zirconia, or the like, and a thermal stabilizer such as lanthana or ceria and optionally having a catalyst deposited thereon to effect a desired catalytic conversion. The devices hereof, with or without catalyst dispersed thereon, may be used as traps for particulate matter, e.g., fine carbon particles as frequently occur in diesel exhaust or for collecting dispersions or aerosols that may be present in the exhaust. Finally, the layers of corrugated thin metal are maintained in spaced relation by the interposition of metal wires or ceramic thread having a predetermined uniform diameter in the unstressed condition and preferably "basket woven" (i.e. draped back and forth between the layers) between the successive layers. The catalytic converters hereof may be stationary, or rotary as disclosed in the aforementioned Ser. No. 089,578. These converters may be enclosed in a suitable housing for adapting to an automobile exhaust line, for example.

BRIEF DESCRIPTION OF THE DRAWINGS

The invention hereof may be better understood by having reference to the annexed drawings showing a preferred embodiment of the invention, and wherein.

DETAILED DESCRIPTION OF THE INVENTION

The present invention is characterized in that it enables the use of normally nesting corrugated thin metal foil layers. Nesting, which would otherwise block the passage of gas through the device, is prevented by the interposition of a fiber or group of fibers between successive layers in the built-up monolith. Nestable corrugated foils are easier and less expensive to produce than the nonnesting corrugated foils.

For purposes of this invention, the term "fiber" includes wire of a predetermined diameter, or a single fiber of ceramic or ceramic/cermet composition, or a thread made up of a plurality of fibers or a formed fiber, e.g., a wire, to conform to the corrugations. For most purposes, the spacing material of choice is a nonvitreous or metal oxide ceramic thread made up of numerous fibers. Such a material is easy to handle and will withstand the temperatures of the exhaust gases and those encountered in regeneration, if the device is used as a particulate trap, for example, in a diesel engine exhaust line.

A highly suitable nonvitreous ceramic thread has the following overall composition:

| Aluminum oxide | 60–75% |
|---|---|
| Boron oxide | 0–18% |
| Silicon dioxide | 20–30% |

A specific composition is:

| Aluminum oxide | 62% |
|---|---|
| Boron oxide | 14% |
| Silicon dioxide | 24% |

Fibers having a composition within the above ranges may be produced in accordance with the teachings of U.S. Pat. No. 3,795,524, supra, which patent is incorporated herein by reference. The specific composition above provides filaments or fibers having the following properties:

| Tensile strength (psi) | 200–250,000 |
|---|---|
| Tensile modulus (psi) | 22,000,000 |
| Nominal diameter (microns) | 10–12 |
| Density (g/cm3) | 2.7 |
| urface area (m2/g) | 0.2 |
| Refractive index | 1.570 |

These fibers and threads made therefrom will withstand temperatures up to 2500° F.

Figure 1:
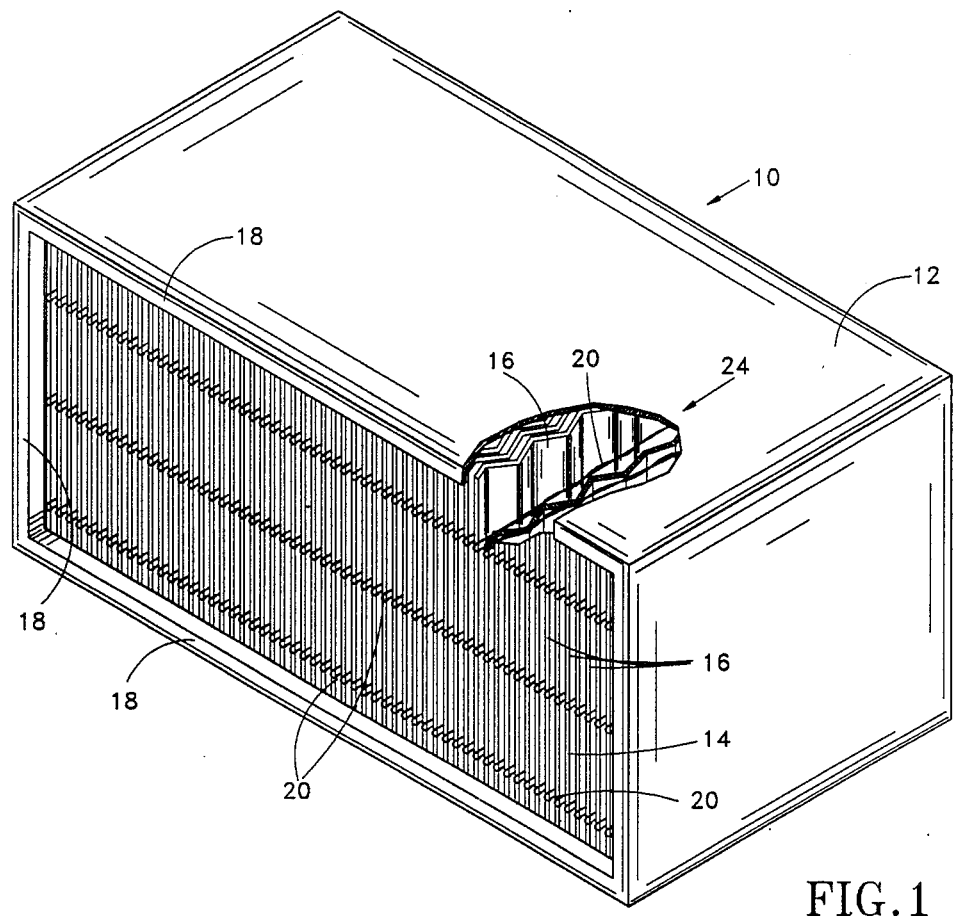
FIG. 1 as an isometric partially cutaway view of a device in accordance with the present invention and showing a converter module having a gas inlet and a gas outlet for exhaust gas, and for insertion in an exhaust gas line, formed of a housing, a plurality of individually cut and layered normally nestable foil segments, and nonvitreous or metal oxide ceramic threads "basket woven" between the layers.
Figure 2:
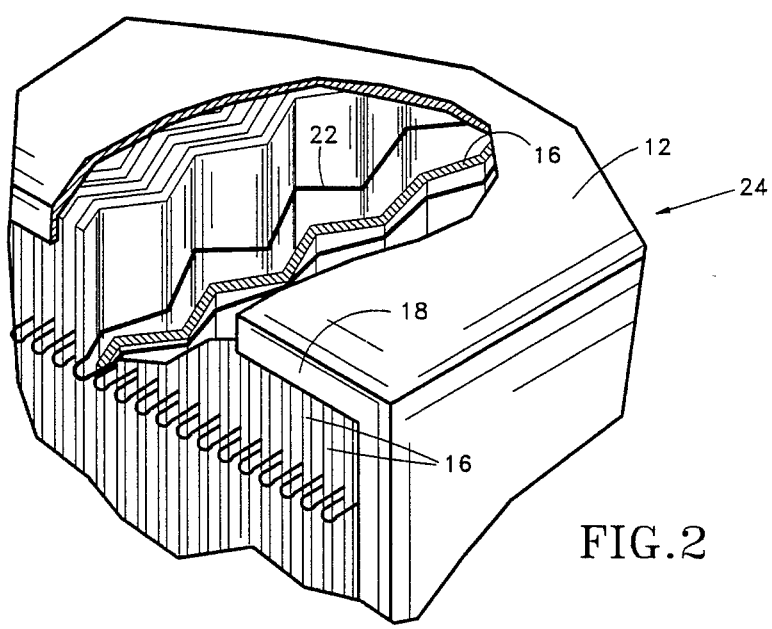
FIG. 2 is like the cutaway portion of FIG. 1, but showing a metallic wire between successive layers of corrugated normally nestable thin metal.
Figure 3:
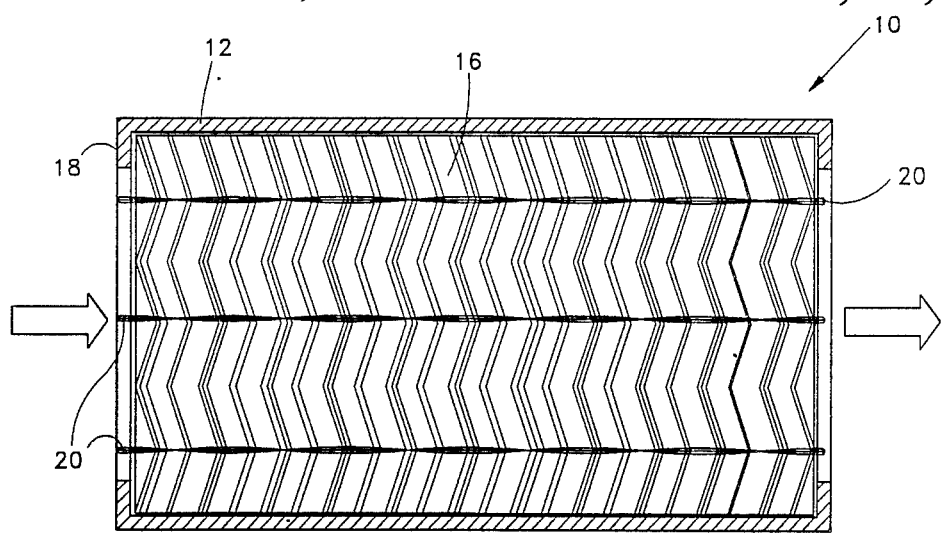
FIG. 3 is a top view of a device such as shown in FIG. 1 but with the top of the housing removed to show a herringbone corrugated normally nestable thin metal foil and illustrating the lateral spacing of foil separating nonvitreous or metal oxide ceramic threads. The gas passes through the converter module from the gas inlet to the gas outlet in a direction parallel to the threads.

The metal foil from which the nestable corrugated layers are produced is desirably a stainless steel foil from about 0.001 to 0.005 inch thick. The foil may desirably be a ferritic stainless steel with 5–8 wt % aluminum content either as a thin (0.0001" to 0.0005") coating of aluminum metal on each side or contained within the body of the foil, or both. The individual layers are conveniently from 3.5 to 8" long for most purposes. However, for large installations for handling exhaust from 500–2000 HP diesel engines in power plants, the layers may be up 10–15 feet in length. The corrugations are generally sinusoidal in geometric configuration although other shapes may be used, such as, square wave, triangular wave, modified sinusoidal where the tops of otherwise triangular waves are merely rounded to relieve stress, conveniently in a herringbone pattern as shown in FIG. 3 or in a straight pattern in which the corrugations are in a straight line as shown in FIGS. 1 and 2. The corrugations have an amplitude of from 0.025 to 0.30 inch, and a pitch of from 0.05 to 0.50 inch.

The corrugated foil may be formed in accordance with the procedure set forth in U.S. Pat. No. 4,711,009 dated December 8, 1987 and issued to Cornelison et al. An alumina washcoat may be applied as described in that patent as well as a catalyst of the type described therein. The foil as produced in accordance with said U.S. Patent is a continuous strip. Conveniently, this strip is cut to desired lengths, e.g., 3.5 inches, 6 inches, or 10 feet. The individual lengths are then laid into a frame, preferably of stainless steel, one by one. After positioning each layer, a plurality of nonvitreous ceramic threads are laid down from a thread feeder over the top of the foil layer. Then another foil layer is placed on the top of the previous foil and on the threads. The plurality of threads are again laid down on top of this layer from continuous strands. The fibers can be spaced apart a distance of from 0.5 to 5.0 inches. In the case of a foil layer 3.5" by 6", three continuous strands spaced apart about 1.5" to 2" with one strand being located centrally of the layer, are utilized. The location of the strands can be done by hand or by a device having a horizontal bar with, say 3 eyes, located therealong at the desired points and an upstanding leg attached at right angles to the horizontal bar, which leg has a height greater than the ultimate height of the module. The bottom of the upstanding leg is hinged to a bottom plate on which plate the case or housing for the module also rests. Threads are fed from a supply source through the eyes. As the frame is manually or mechanically oscillated from one side to the other, the three threads are laid down on top of each layer.

After the threads or fibers are in place, the entire assembly is compressed and the frame closed around the assembly and welded shut.

Referring now more particularly to FIG. 1, there is here shown a partially cut-away isometric view of a module generally indicated by the numeral 10 and in accordance with the present invention. The module 10 is provided with a metal housing 12, usually of stainless steel surrounding a bundle 14 of individual compacted layers 16. To retain the layers 16 in alignment, the housing 12 is provided with marginal overfolded lips 18. The lips 18 prevent movement of the individual layers 16 in response to the pulsing of the engine in, for example, an internal combustion engine. The layers 16 are, as indicated above, corrugated thin metal which when laid up one on top of the other, would normally nest together and "blind" the module and prevent the transmission of gas, e.g., exhaust gas therethrough. As shown in FIG. 1, the corrugations are in the form of a regular triangular pattern. As above indicated, they could be in any geometric pattern, e.g., sinusoidal, square wave, trapezoidal waves, or modified triangular waves in which the apices are rounded off to relieve stress. Examples of such wave forms are illustrated in the co-pending application of Wesley P Bullock and William A. Whittenberger entitled "Nonnesting, Straight Corrugation Metal Foil and Method for making Same", now U.S. Pat. No. 4,810,588.

The corrugated foil layers 16 are maintained in spaced relation by the interposition of a fiber or a bundle of fibers 20 looped around the ends and between the successive layers 16. These fibers or threads 20 restrain the otherwise normally nesting foil layers 16 against nesting and blocking the passage of gas through the device 10. In the embodiment shown in FIG. 1, three threads 20, e.g., nonvitreous or metal oxide ceramic threads as above described, are uniformly spaced across the width of the foil layer 16. Two or more such threads or fibers 20 may be used, and for best results, should not be spaced more than about 1.5 inches apart.

FIG. 2 shows the cut-out portion 24 of FIG. 1 on an enlarged scale. In this embodiment, instead of a bundle of fibers 20, the spacing means are metallic wires 22, e.g., stainless steel wires 22 having the desired diameter as indicated above. Like numbers in FIG. 2 correspond to the same numbers in FIG. 1.

FIG. 3 is a cross-sectional view of a device like that shown in FIG. 1. It has, however, a herringbone pattern corrugation. There are here shown three ceramic threads 20 spaced uniformly across the width of the layer 16. As indicated above, these threads 20 are continuously woven between the layers 16 in a "basket weave" by hand, or a suitable thread depositing device as above described. The arrows indicated the direction of flow of the gas being treated to remove particles, or to chemically convert the pollutants in the gas to environmentally acceptable gases or agents.

Figure 4:
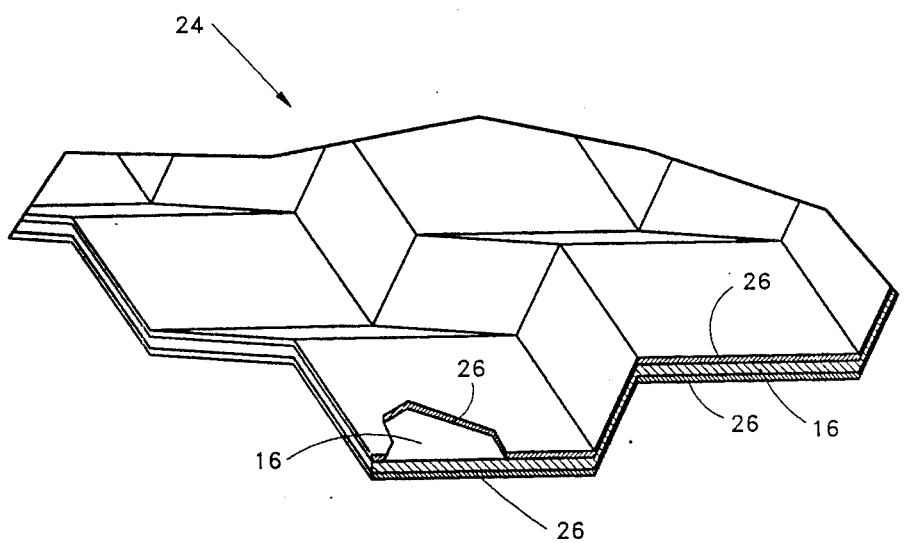
FIG. 4 is an isometric end view on an enlarged scale showing a fragment of a herringbone pattern corrugated metal foil and illustrating a thin layer of refractory metal oxide on each surface thereof.

FIG. 4 is an isometric view on an enlarged scale of a portion of a corrugated thin metal foil 16 useful herein. The foil 16 prior to any treatment is preferably provided with a coating of aluminum on each surface thereof. During treatment of the corrugated foil in accordance with the above-mentioned U.S. Pat. No. 4,711,009, supra, the aluminum may be at least partially converted to alumina to which a subsequently applied washcoat 26 of alumina is applied and adheres very strongly. Other useful oxide coatings include refractory metal oxides, e.g., titania, zirconia, alumina/ceria, etc. or iron oxide, or other metal oxides such as chromium oxide. A catalyst, e.g., palladium or platinum, or palladium/rhodium mixed catalyst may be deposited on the washcoat 26 to provide a catalytically active surface for converting pollutants into harmless gaseous ingredients for discharge into the atmosphere. The alumina metal coating is very thin, usually being no more than about 0.0005" per side thickness.

There has thus been provided a converter module utilizing a corrugated thin metal foil cut to desired segments or layers and superimposed layer upon layer. These foil layers would normally nest and "blind" the converter to the passage or gas therethrough. To prevent nesting, a fiber or bundle of fibers, of either metal or ceramic material capable of withstanding the temperatures to which the device is submitted, is provided at suitable intervals. The fiber or fibers may be corrugated or otherwise made of a length equal to the length of the layers or may be continuous and woven between successive layers. The device may be used as a catalytic converter and/or a particle remover and can be made with or without a catalyst. When used as a particulate trap, means must be provided for regenerating the device, such as by thermally oxidizing carbon, sulfur, or volatile organic compounds at a temperature of 1200° F., for example.

We claim:

1. A converter for altering the composition of gases passing therethrough and comprising a gas inlet and a gas outlet; a plurality of individual layers having a predetermined length and extending between the inlet and outlet, said layers being normally nestable corrugated thin metal foil having on each surface thereof a coating comprising a refractory metal oxide and optionally a heavy metal catalyst deposited thereon; and a plurality of flexible fibers positioned between said layers and extending cross-wise of the corrugations and each said fiber having a length sufficient to span said predetermined length in a direction parallel to the gas flow between the inlet and the outlet wherein said layers are partially nested and separated from each other by a distance substantially equal to the thickness of said fibers.

2. A converter in accordance with claim 1 wherein said fibers are in the form of a thread.

3. A converter in accordance with claim 1 wherein said fiber is a nonvitreous inorganic ceramic thread.

4. A converter in accordance with claim 1 wherein said fibers are draped back and forth among the successive layers of corrugated thin metal foil.

5. A converter in accordance with claim 1 wherein the thin metal foil is stainless steel.

6. A converter in accordance with claim 1 wherein the thin metal foil is aluminum coated stainless steel.

7. A converter in accordance with claim 1 wherein the refractory metal oxide comprises alumina.

8. A converter in accordance with claim 1 wherein the refractory metal oxide is a mixture of alumina and ceria.

9. A converter in accordance with claim 1 wherein the refractory metal oxide comprises zirconia.

10. A converter in accordance with claim 1 wherein the refractory metal oxide comprises chromium oxide.

11. A converter in accordance with claim 1 wherein the refractory metal oxide comprises titania.

12. A converter in accordance with claim 1 including a catalyst and wherein the catalyst comprises palladium.

13. A converter in accordance with claim 1 including a catalyst and wherein the catalyst comprises platinum.

14. A converter in accordance with claim 1 inlcuding a catalyst and wherein the catalyst is a mixture of palladium and rhodium.

15. A converter in accordance with claim 1 wherein the fibers are spaced apart a distance of from 0.5 to 5.0 inches.

16. A converter in accordance with claim 1 wherein the thin metal foil is aluminum coated stainless steel, and the refractory metal oxide is alumina.

17. A converter in accordance with claim 1 wherein the thin metal foil is aluminum coated stainless steel, the refractory metal oxide is alumina, and a catalyst is deposited on the surfaces of said metal oxide and the catalyst comprises palladium.

18. A converter in accordance with claim 1 wherein the thin metal foil is aluminum coated stainless steel, the refractory metal oxide is alumina, and a catalyst is deposited on the surfaces of said metal oxide and the catalyst comprises platinum.

19. A catalytic converter in accordance with claim 1 wherein the thin metal foil is aluminum coated stainless steel, the refractory metal oxide is alumina, a catalyst is deposited on the surfaces of said metal oxide and the catalyst comprises platinum, and the fibers are nonvitreous inorganic ceramic.

20. A converter in accordance with claim 1 wherein the corrugations have a herringbone configuration across the width of the layer.

21. A converter in accordance with claim 1 wherein said fibers are in the form of a metallic wire.

22. A converter in accordance with claim 21 wherein the metallic wire is corrugated to mesh with the corrugations of the thin metal.

23. A converter in accordance with claim 21 wherein said metallic wire is a stainless steel wire.

* * * * *